United States Patent [19]

Aksamit

[11] Patent Number: 4,770,579

[45] Date of Patent: Sep. 13, 1988

[54] PICK-UP VEHICLE BED CARGO HOLDING DEVICE

[76] Inventor: James A. Aksamit, Rte. 3, Wood Rd., Taylors, S.C. 29687

[21] Appl. No.: 926,127

[22] Filed: Nov. 3, 1986

[51] Int. Cl.$^4$ ............................................. B61D 45/00
[52] U.S. Cl. ..................................... 410/150; 410/31; 410/120; 410/121
[58] Field of Search ............... 410/143, 150, 152, 121, 410/129, 130, 140, 31, 34, 96, 97, 120

[56] References Cited

U.S. PATENT DOCUMENTS

| | | | |
|---|---|---|---|
| 1,049,655 | 1/1913 | Boller et al. | 410/130 |
| 3,073,260 | 1/1963 | Dunlap et al. | 410/143 X |
| 4,464,089 | 8/1984 | Allen | 410/143 X |
| 4,639,031 | 1/1987 | Truckenbrodt | 410/130 X |
| 4,650,383 | 3/1987 | Hoff | 410/152 X |

FOREIGN PATENT DOCUMENTS 540442 5/1957 Canada ............................... 410/121

*Primary Examiner*—Kenneth J. Dorner
*Assistant Examiner*—James R. Brittain
*Attorney, Agent, or Firm*—Cort Flint

[57] ABSTRACT

A cargo holding device (A,C) is disclosed for holding cargo in a vehicle bed (12) of a pick-up truck (14). Longitudinal side rails (16) carry the cargo holding device to position the device in the desired longitudinal position along the vehicle bed. The cargo holding device may include an articulated cargo holder (B) having a plurality of segmented cargo braces (26,28,30). The segmented cargo braces may be adjusted and set in a number of pivoted positions relative to each other to assume an angular orientation for holding cargo against movement in two directions. An adjustable index bar (54) may engage a number of index grooves (58) to lock each of a number of locking joints (53). The cargo holding device may also be provided in the form of a brace bar (84) pivoted at the end of a vertical leg (72) which may be adjusted in its vertical and transverse position relative to the vehicle bed. Adjustable clamp blocks (22) allow for adjustment of a transverse member (70) over the vehicle bed and a second slide block clamp (74) positions cargo brace transversely of the vehicle bed. The pivotal cargo brace (84) may be adjusted to a desired angle orientation to hold cargo in a wedged position in the vehicle bed.

21 Claims, 3 Drawing Sheets

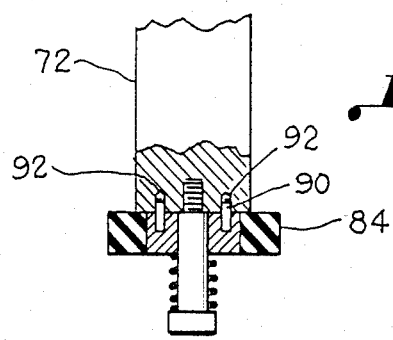
Fig. 6.
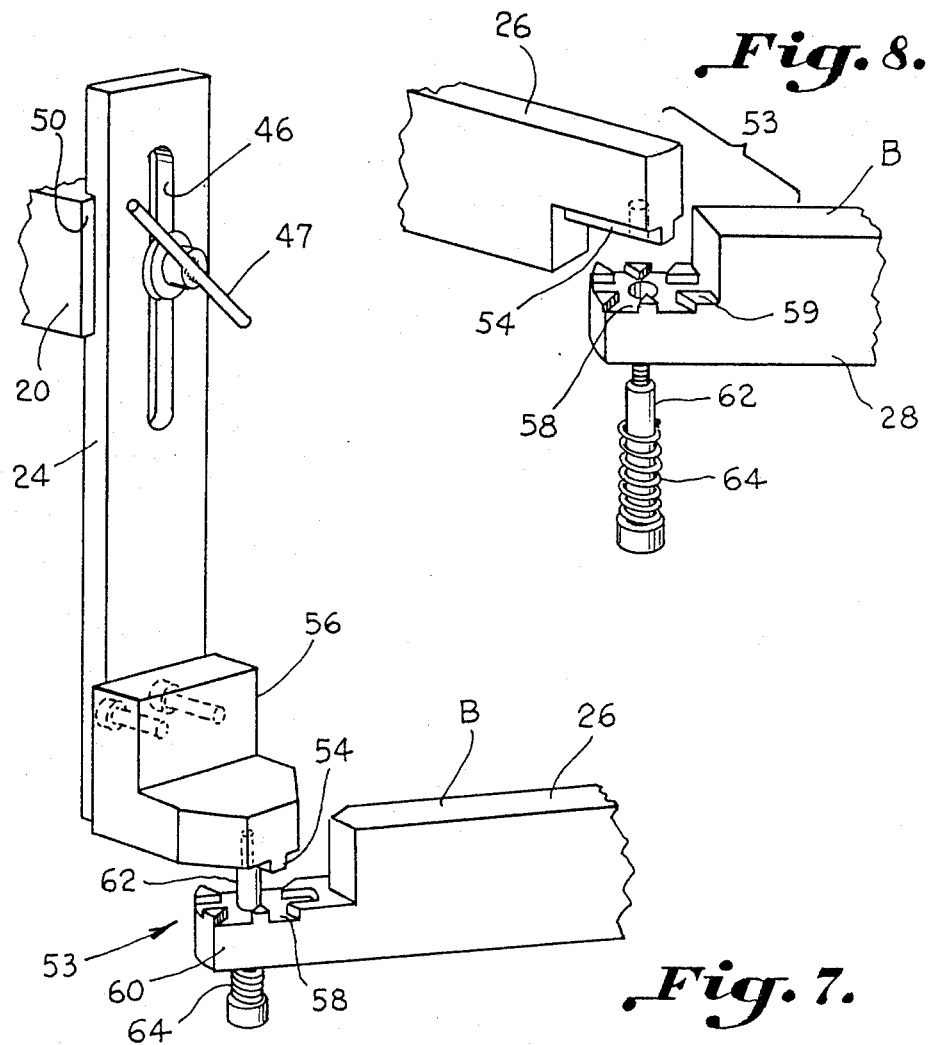
Fig. 8.
Fig. 7.

PICK-UP VEHICLE BED CARGO HOLDING DEVICE

BACKGROUND OF THE INVENTION

The invention relates to a cargo holding device for holding cargo in the vehicle bed of a pick-up truck.

The utilization of pick-up trucks for pleasure and business has increased considerably over the recent years. However, the vehicle cab is limited in space for carrying cargo and ordinary items such as luggage, groceries, shopping items, etc. While considerable space is available in the vehicle bed, practical and effective devices for holding cargo and other items in the vehicle bed have not been provided. Therefore, while pick-up trucks have become more popular, the enjoyment of their full use has not been possible due to the lack of a way to carry cargo and other items in the vehicle bed in a stable manner.

Heretofore, devices have been proposed such as shown in U.S. Pat. Nos. 4,121,849 and 2,770,471 for holding down cargo such as lumber in the vehicle bed of a pick-up truck.

U.S. Pat. No. 2,697,631 discloses a petitioning member which may be slidably adjusted longitudinally along the vehicle bed of a pick-up truck for containing cargo.

However, none of these devices are satisfactory for holding cargo or other items which will not fit in the vehicle cab but which due to their shape or size there exists a problem of containing the cargo in the vehicle bed.

Accordingly, an object of the invention is to provide a holding device for holding cargo and other miscellaneous items in the vehicle bed of a pick-up truck which may be easily used by the vehicle operator on routine shopping trips or travel.

Still another object of the invention is to provide a holding device for holding cargo in the vehicle bed of a pick-up truck which may be easily adjusted to hold between the device and the walls of the vehicle bed in a stable manner.

Still another object of the invention is to provide a holding device for holding cargo in the vehicle bed of a pick-up truck which may be readily adjusted to a desired angular orientation with respect to the vehicle bed so that a wide variety of cargo sizes and shapes may be held and retained in the vehicle bed without shifting for safe transportation.

Still another object of the invention is to provide a holding device for holding cargo in the vehicle bed of a pick-up truck which may be readily positioned for holding a wide variety of cargo and other items in a vehicle bed and which may be locked in position quite easily by the vehicle operator in a simple and convenient manner.

SUMMARY OF THE INVENTION

The above objections are accomplished according to the present invention by providing a cargo holding device for the vehicle bed of a pick-up truck and the like wherein at least one longitudinal rail is affixed to the interior side of the vehicle bed and a transverse member is slidably carried by the longitudinal rail so that it may move lengthwise over the vehicle bed for positioning. A pivotal cargo holder is pivotally carried by the transverse member and may be pivoted in a horizontal plane to a number of set angular positions relative to the vehicle bed for engaging and holding cargo against shifting in two degrees of freedom in the vehicle bed. Adjustable locking mechanism is provided for locking the pivotal cargo holder in one of the set positions. The cargo holder is carried on a vertically adjustable leg by the transverse member so that the cargo holder may be adjusted vertically to hold cargo against the floor of the vehicle bed or to engage cargo at a proper height in the vehicle bed wedged against the walls of the vehicle bed. The pivotal cargo holder may be a brace bar attached to the vertically adjustable leg so as to pivot in a horizontal plane relative to the vertical leg, and locked in any one of a number of index positions provided by an adjustable lock. In this manner, the cargo brace may be pivoted parallel or forty-five degrees to the walls for effectively wedging cargo. In another embodiment, the pivotal cargo holder may consist of an articulated arm having a number of brace segments which interlock at respective angles to each other to conform generally to the shape of the cargo and hold the cargo in the vehicle bed.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 6 is a sectional view taken along line 6—6 of FIG. 5;

FIG. 7 is an enlarged perspective view of the cargo holder device of FIG. 1; and FIG. 8 is a perspective view with parts separated of an indexing lock joint for an articulated cargo holder constructed in accordance with the present invention.

DESCRIPTION OF A PREFERRED EMBODIMENT

Figure 1:
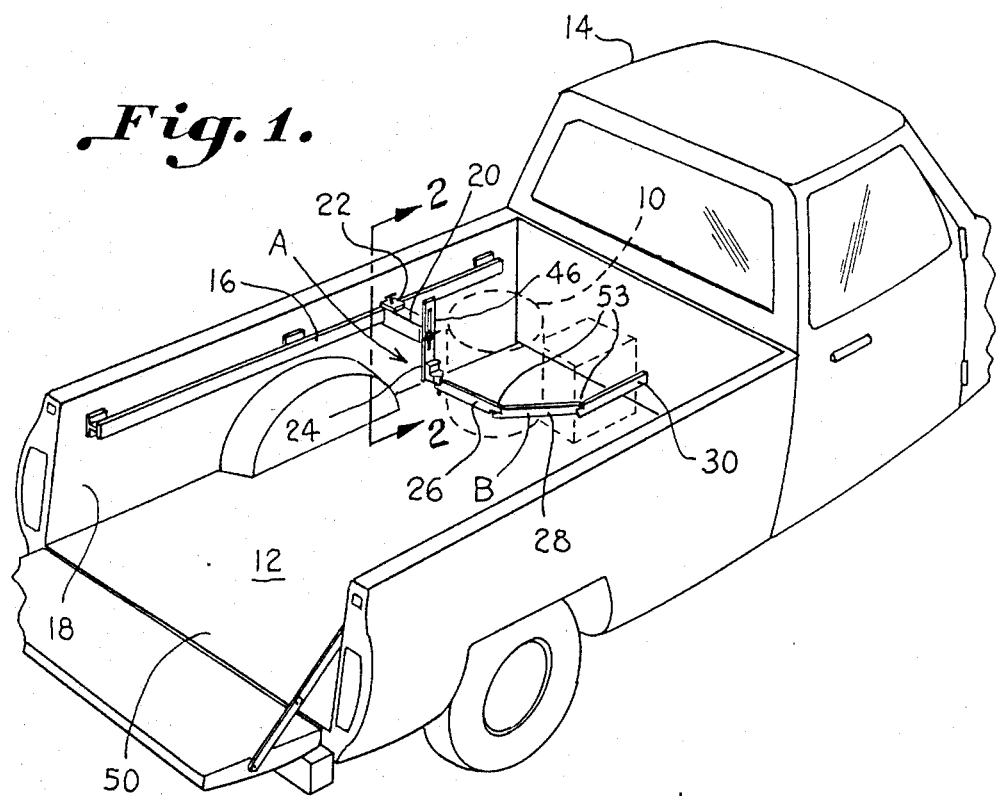
FIG. 1 is a perspective view of a vehicle bed of a pick-up truck which incorporates a cargo holding device constructed in accordance with the present invention.

Referring now in more detail to the drawings, a cargo holding device designated generally as A is illustrated for holding cargo 10 in a vehicle bed 12 of a pick-up truck 14. The cargo holding device includes a longitudinal rail 16 carried on an interior side 18 of vehicle bed 12. A transverse member 20 is carried by longitudinal rail 16 in a slidable manner by means of a sliding clamp block 22. A vertically adjustable leg 24 is carried by transverse member 20. A pivotal cargo holder B is affixed to vertical leg 24. Pivotal cargo holder B includes a plurality of segmented cargo braces 26, 28, and 30. These provide an articulated cargo holder.

Figure 2:
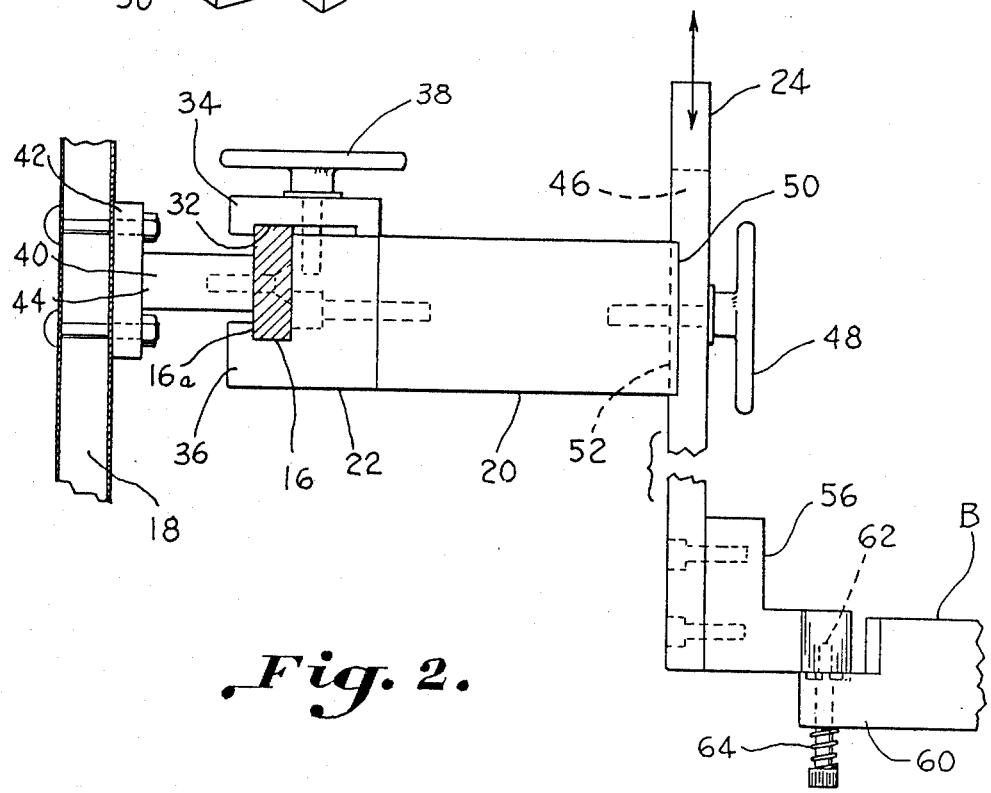
FIG. 2 is a sectional view taken along line 2—2 of FIG. 1.
Figure 3:
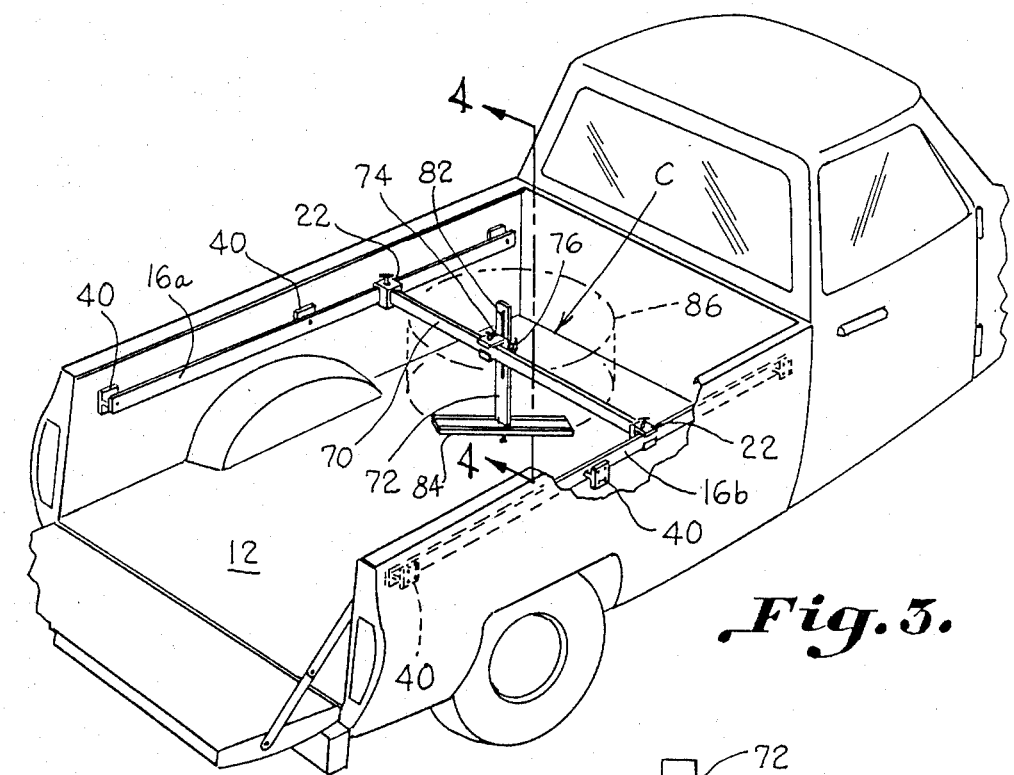
FIG. 3 is a perspective view of a vehicle bed of a pick-up truck incorporating a cargo holding device constructed in accordance with another embodiment of the invention.
Figure 4:
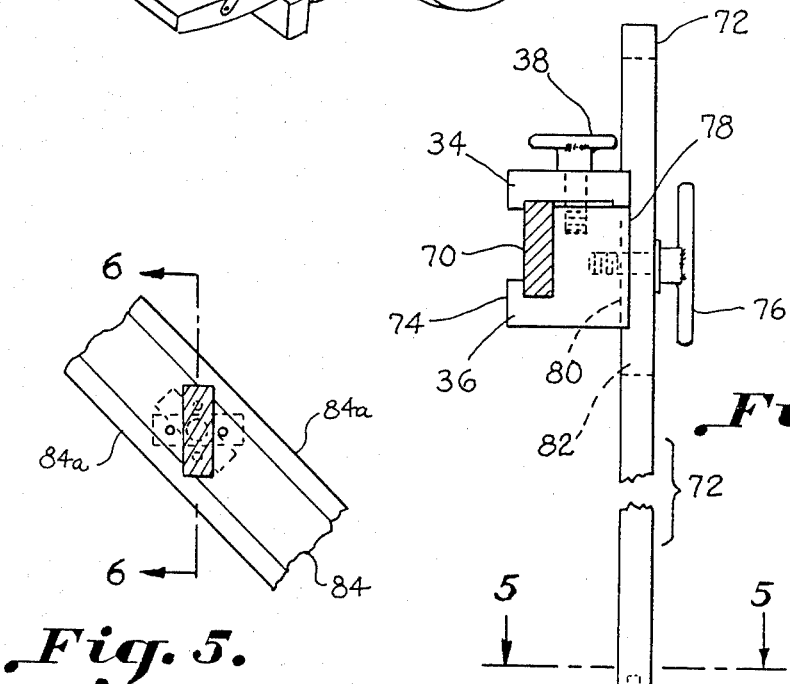
FIG. 4 is a sectional view taken along line 4—4 of FIG. 3.
Figure 5:
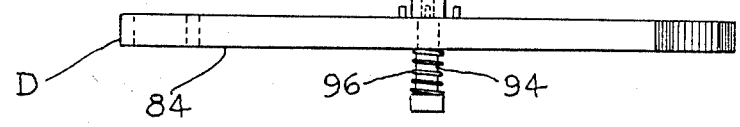
FIG. 5 is a bottom plan view of a cargo brace bar of the cargo holder device of FIG. 4.

As can best be seen in FIG. 2, slidable clamp block 22 includes a generally C-shaped clamping section 32 defined by closed clamping lips 34 and 36. Clamping lip 34 is movable and provides a clamp which may be tightened against side rail 16 by means of a clamp screw 38 threaded into block 22.

Side rail 16 is attached to vehicle bed side 18 by means of a plurality of T-shaped attachment members 40 which include an attachment flange 42 bolted to vehicle bed side 18 and a web 44 which is bolted to side rail 16. It can be seen that attachment web 44 has a narrow cross-section as compared to side rail 16 whereby portions of the back side of rail 16 at 16a are left exposed so that the clamping lips may extend over the side rail to effectively clamp and hold the slidable clamp block. It will be noted that clamping lip 34 clamps smoothly on the top of slide rail 16 so that no scratches or endentures are made as would inhibit sliding of clamp block 22 over side rail 16. Narrow attachment web 44 ensures that the clamping lips do not strike the attachment members 40 during sliding action of clamp block 22 over side rail 16.

Vertically adjustable leg 24 includes a slot 46 through which a slot set screw 48 extends to fix the position of vertical leg 24 at a desired vertical position relative to floor of vehicle bed 12. Transverse member 20 is in the form of a bar whose free end includes a pair of vertical ridges 50 which define a groove 52 and which vertical leg 24 may vertically slide without twisting relative to transverse 20.

Adjustable locking means for locking pivotal cargo holder B in a number of fixed positions corresponding to prescribed angular orientations relative to the vehicle bed is provided by a locking index joint 53 which includes an index bar 54 formed on an index block 56 bolted to vertical leg 24. Index bar 54 cooperates with a plurality of index grooves 58 formed in a reduced end 60 of brace segment 26. A pin 62 attaches brace 26 to block 56 and is provided with a compression spring 64 urging end 60 of brace 26 upwardly so that index bar 54 engages one of the grooves 58. Brace 26 may be moved downwardly and pivoted whereupon release index bar 40 engages an index groove 58 to lock the brace in a fixed pivotal position.

Segmented braces 28 and 30 are adjoined by like index joints 53 and may be pivoted relative to each other to assume a desired angular orientation relative to the vehicle bed which will engage cargo 10 and limit the movement of the cargo in two degrees of freedom, i.e. longitudinal and lateral directions relative to the vehicle bed. The cargo is effectively wedged between the cargo holder and the vehicle bed. Longitudinal and lateral movement is minimized in the vehicle bed.

Another embodiment of the invention can best be seen in FIGS. 3-6. In this embodiment a first longitudinal side rail 16a is carried on one interior side of vehicle bed 12 and a second longitudinal rail 16b is carried on the opposing interior side of vehicle bed 12. A transverse member 70 is a bar which extends between longitudinal rails 16a and 16b. The distal ends of transverse member 70 are slidably carried on rails 16a and 16b by means of slide clamp blocks 22 which provide a first means for locking the position of the transverse members lengthwise relative to the vehicle bed. Clamp box 22 may be affixed to the ends of transverse member 17 in a suitable manner. Side rails 16a and 16b are attached to the interior sides of vehicle bed 12 by means of the T-shaped attachment members 40.

In this embodiment, a vertically adjustable leg 72 may be adjusted vertically as well as transversely with respect to the vehicle bed. This is because vertically adjustable leg 22 is carried on a slidable clamp block 74 which is identical to clamp block 22 except that a slot set screw 76 is threaded into the front end of the clamp block which is provided with vertical ridges 78 to define a groove 80 in which vertical leg 72 slides. For this purpose, vertical leg 72 includes a slot 82. Clamping block 74, clamp screw 38, and slot set screw 76 provide a second means for fixing the vertical and lateral positions of adjustable leg 72 with respect to the vertical bed. It is also contemplated that adjustable leg 72 may be mounted horizontally on top of clamp block 74 by means of engagement between clamp screw 38 and clamp lip 34 which constitutes the top of the clamping block.

Adjacent a remote end of leg 72 is a cargo holding device in the form of a pivotal cargo brace bar 84. Adjustable locking means is provided for setting and locking brace bar 84 in a number of pivotal positions to assume an angular orientation with respect to the vehicle bed and cargo contained therein. For example, as can best be seen in FIG. 3, brace bar 84 may be turned forty-five degrees with respect to the vehicle bed to wedge a cargo container 86 into a corner of the vehicle bed. This limits motion in the longitudinal and lateral directions in the vehicle bed.

Adjustable lock means includes a number of index pins 90 carried by brace bar 84 and a number of index holes 92 formed in the ends of vertical leg 72. A threaded post 94 attaches brace 84 to vertical leg 72 and a compression spring 96 urges brace bar 84 upwardly so that pins 90 engage in openings 92. Brace 84 may be pushed down against spring 96 and pivoted to a different angle of orientation whereupon release of brace 84 allows pins 90 to engage openings 92 in the new angular orientation position. Thus, bar 84 may be fixed in a number of pivotal positions to assume a desired angular orientation for holding cargo.

Leg 72 may also be mounted in a horizontal position by set screw 38 whereby brace bar 84 can wedge items against the walls from a higher elevation. Edges of bar 84 may be provided with resilient stripping 84a to engage the cargo.

Thus, it can be seen in accordance with the present invention that an effective and simple to operate cargo holding device may be had. The device is readily adjustable to a number of pivoted positions and locked therein to assume a prescribed angular orientation for holding cargo against longitudinal and lateral movement in the vehicle bed and effectively retaining the cargo. A wide variety of cargo shapes and sizes may be held in the vehicle bed of pick-up truck with the device of the present invention. The device is simple to operate and adjusts to hold the cargo and may readily be done by the operator for carrying cargo in the vehicle bed such as round containers like drums, grocery bags, luggage, and almost any other shape and type of cargo.

While a preferred embodiment of the invention has been described using specific terms, such description is for illustrative purposes only, and it is to be understood that changes and variations may be made without departing from the spirit or scope of the following claims.

What is claimed is:

1. A cargo holding device for holding cargo and other items in the vehicle truck of a pick-up truck comprising:

at least one longitudinal rail carried by an interior side of said vehicle bed;

a transverse member slidably carried by said rail lengthwise for movement over said vehicle bed;

pivotal cargo holding means carried by said transverse member pivotable generally in a horizontal plane to a number of set angular positions relative to said vehicle bed for holding said cargo against said vehicle bed and limiting movement of said cargo in two-degrees of freedom;

adjustable locking means for locking said pivotal cargo holding means in one of said set positions; and said pivotal cargo holding means including a vertically adjustable leg carried by said transverse member; and a pivotal cargo brace carried adjacent an end of said leg pivotable to said set angular positions.

2. The device of claim 1 wherein said means for locking said pivotal member in a number of set angular positions includes index means cooperating between said vertical leg and said cargo brace for locking said cargo brace in a number of prescribed indexed angular positions.

3. The device of claim 1 wherein said pivotal cargo holder means comprises:

said vertically adjustable leg carried by said transverse member adjustable to a variety of vertical positions relative to said side rail; and said pivotal cargo brace including an articulated cargo holder carried by said vertical leg having a plurality of cargo brace segments adjoining one another which are set by said locking means and locked in prescribed angular relation to each other.

4. The device of claim 3 wherein said locking means includes an adjustable index joint having a number of lockable index positions for locking said adjoining said brace segments together in prescribed index angular orientations relative to each other and said vehicle bed in a manner that said cargo is effectively encircled and retained by said brace segments.

5. The device of claim 1 including a first side rail affixed to one side of said vehicle bed and a second side rail affixed to the opposing side of said vehicle bed, and wherein said transverse member is a bar extending between said two longitudinal side rails which slides along said slide rails.

6. The device of claim 5 including:

a slidable clamp block carried along the length of said transverse bar;

said adjustable vertical leg being carried by said clamp block; and said slidable clamp block including a clamp for clamping said clamp block and fixing the lateral position of said vertically adjustable leg across the width of said vehicle bed.

7. The device of claim 1 including:

a plurality of T-shaped attachment members attached to the interior side of said vehicle bed which include a flange attached to the vehicle bed and a web connected to said flange projecting inwardly of said vehicle bed;

said longitudinal side rail being attached to said web in a manner that a portion of a back side of said rail is left exposed at opposing sides of said web; and a slidable clamp block attaching said transverse member to said slide rail which includes a generally C-shaped clamping section received on said rail having opposed clamping lips which extend over said exposed portion of the back side of said rail terminating short of said web.

8. The device of claim 7 wherein said clamp block includes a clamp screw for tightening one of said clamping lips against said side rail to lock said transverse member in a desired position lengthwise of said vehicle bed.

9. A cargo holding device for holding cargo and other items in the vehicle bed of a pick-up bed comprising:

a first side rail attached to a first interior side of said vehicle bed;

a second side rail attached to a second interior side of said vehicle bed;

a transverse bar extending between said first and second side rails having distal ends slidably carried by said first and second side rails;

first means for locking said ends of said transverse bar to said first and second rails at a desired position along the length of said vehicle bed;

an adjustable vertical leg slidably carried by said transverse bar for lateral movement across said vehicle bed and for vertical movement relative to said transverse bar and said vehicle bed;

a second means for locking said leg on said transverse bar in a desired lateral and vertical position relative to said vehicle bed;

a pivotal cargo holder carried adjacent an end of said vertical leg; and adjustable locking means for locking said pivotal cargo holder in a number of set positions to fix said cargo holder in a prescribed angular orientation relative to said vehicle bed for holding cargo against said vehicle bed.

10. The device of claim 9 including:

a slidable clamp block carried along the length of said transverse bar;

said adjustable vertical leg being carried by said clamp block; and said slidable clamp block including a clamp for clamping said clamp block and fixing the lateral position of said vertically adjustable leg across the width of said vehicle bed.

11. The device of claim 9 including:

a plurality of T-shaped attachment members attached to the interior side of said vehicle bed which include a flange attached to the vehicle bed and a web connected to said flange projecting inwardly of said vehicle bed;

said longitudinal side rail being attached to said web in a manner that a portion of black side of said rail is left exposed at opposing sides of said web; and a slidable clamp block attaching said transverse member to said slide rail which includes a generally C-shaped clamping section received on said rail having opposed clamping lips which extend over said exposed portion of the back side of said rail terminating short of said web.

12. The device of claim 11 wherein said clamp block includes a clamp screw for tightening one of said clamping lips against said side rail to lock said transverse member in a desired position lengthwise of said vehicle bed.

13. The device of claim 9 wherein said pivotal cargo holder includes a cargo brace bar pivotally carried adjacent an end of said vertical leg, and said adjustable locking means includes an index lock connecting said vertical leg and said cargo brace bar.

14. The device of claim 13 wherein said index lock includes a number of indexes carried by one of said vertical leg or brace bar and an indexing element carried by the other of said vertical leg or brace bar cooperating with said indexes to lock said brace bar in one of said prescribed angular orientations.

15. The device of claim 13 wherein said brace bar includes resilient strips for engaging said cargo.

16. A cargo holding device for holding cargo in the vehicle bed of a pick-up bed and the like comprising:
   a longitudinal side rail carried by an interior side of said vehicle bed;
   a slidable clamp block carried by said slide rail;
   an articulated cargo holder including a jointed, articulated brace pivotally carried by said clamp block for pivotal movement in a horizontal plane about said clamp block, said articulated brace including a plurality of jointed brace segments adjoining one another;
   an adjustable joint joining adjacent brace segments together; and
   adjustable lock means for fixing said brace segments at a number of pivotal positions relative to each other in a manner that said brace segments are set in prescribed angular orientations in said horizontal plane for effectively encircling and holding cargo between said articulated cargo holder and said vehicle bed.

17. The device of claim 16 including:
   a plurality of T-shaped attachment members attached to the interior side of said vehicle bed which include a flange attached to the vehicle bed and a web connected to said flange projecting inwardly of said vehicle bed;
   said longitudinal side rail being attached to said web in a manner that a portion of a back side of said rail is left exposed at opposing sides of said web; and
   a slidable clamp block attaching said transverse member to said slide rail which includes a generally C-shaped clamping section received on said rail having opposed clamping lips which extend over said exposed portion of the back side of said rail terminating short of said web.

18. The device of claim 17 wherein said clamp block includes a clamp screw for tightening one of said clamping lips against said side rail to lock said transverse member in a desired position lengthwise of said vehicle bed.

19. The device of claim 16 including an adjustable vertical leg carried by said clamp block means adjusting and fixing the vertical position of said leg, and said articulated cargo holder being carried by said vertical leg.

20. The device of claim 16 wherein said adjustable locking means includes an index lock joint adjoining ends of adjacent brace segments, a number of indexes included in said lock joint and an indexing member locking with said indexes providing said number of pivotal positions.

21. The device of claim 20 wherein said indexes include grooves and said indexing member includes an index bar fitting in said grooves.

* * * * *